United States Patent [19]
Mendenhall

[11] Patent Number: 5,433,250
[45] Date of Patent: Jul. 18, 1995

[54] HYDRAULIC LINE SWITCHES

[76] Inventor: George A. Mendenhall, 4252 S. Eagleson Rd., Boise, Id. 83705

[21] Appl. No.: 301,729

[22] Filed: Sep. 7, 1994

Related U.S. Application Data

[63] Continuation of Ser. No. 118,018, Sep. 8, 1993, abandoned, which is a continuation-in-part of Ser. No. 19,581, Feb. 18, 1993.

[51] Int. Cl.$^6$ .............................................. F16K 11/02
[52] U.S. Cl. ......................................... 137/874; 251/62
[58] Field of Search .......................... 137/874; 251/62

[56] References Cited

U.S. PATENT DOCUMENTS

| | | | |
|---|---|---|---|
| 2,819,123 | 1/1958 | Montgomery | 302/59 |
| 3,132,669 | 5/1964 | Feldstad | 137/874 X |
| 3,334,947 | 8/1967 | Orsi | 302/28 |
| 3,489,178 | 1/1970 | Kice | 137/625.41 |
| 3,527,252 | 9/1970 | Cook et al. | 137/874 |
| 3,771,560 | 11/1973 | Conti et al. | 137/874 |
| 3,774,863 | 11/1973 | Ekama | 243/29 |
| 3,834,418 | 9/1974 | Clancy | 137/874 X |
| 3,860,031 | 1/1976 | Grill | 137/610 |
| 3,961,643 | 6/1976 | Lynch | 137/874 X |
| 4,055,280 | 10/1977 | Kohl et al. | 222/70 |
| 4,442,865 | 4/1984 | Shigeo | 137/884 |
| 4,614,141 | 9/1986 | Mendenhall et al. | 83/402 |
| 4,836,250 | 6/1989 | Krambrock | 137/625.47 |
| 5,095,794 | 3/1992 | Mendenhall | 83/858 |
| 5,125,308 | 6/1992 | Mendenhall | 83/857 |

FOREIGN PATENT DOCUMENTS 3319273 12/1983 Germany .......................... 137/884

*Primary Examiner*—John C. Fox
*Attorney, Agent, or Firm*—Frank J. Dykas

[57] ABSTRACT

Hydraulic line switcher (10) for use with a hydraulic food cutting system having flexible tube (50) supported in cradle (52). Flexible tube (50) is conically tapered from a larger inlet to a smaller outlet and attached to slide plate (78). Air cylinder (94), through lever (104) is used to selectively position slide plate (78) to one of a plurality of discharge ports quickly enough to prevent initiation of system blockage, and with sufficient force to shear trapped food product.

12 Claims, 13 Drawing Sheets

HYDRAULIC LINE SWITCHES

This application is a continuation of application Ser. No. 08/118,018, filed Sep. 8, 1993 now abandoned, which is a continuation in part of U.S. patent application Ser. No. 08/019,581, entitled HYDRAULIC FOOD CUTTER WITH AUTOMATIC BLADE CHANGER, originally filed Feb. 18, 1993.

DESCRIPTION

BACKGROUND OF THE INVENTION

Technical Field

This invention relates to a hydraulic line switcher and more particularly to a hydraulic line switcher for use with a hydraulic food cutting system having two or more hydraulic food cutting blade assemblies.

DISCLOSURE OF THE INVENTION

Background Art

Many food products, particularly vegetables and fruits are processed prior to sale either by canning or freezing. Unless the product involved is of a naturally occurring edible size, for example peas, the product is usually trimmed and sliced, or diced, to edible size prior to preservation processing such as canning or freezing.

The slicing, dicing and other cutting operations have traditionally been accomplished with mechanical cutters. However, relatively recent advances in food product cutting technologies have resulted in the common use of hydraulic cutting apparatus which can be used to cut food products at relatively high speeds. Cutting capacities of 20,000 pounds to 35,000 pounds per hour are not unusual.

Hydraulic food cutters are used to cut a wide variety of food products, including potatoes, beets, zucchini or cucumbers, amongst others. The prior art relevant to the present invention are the food cutting devices themselves, and not the food product being cut. However, to place the present invention in proper context, and for purposes of clear illustration, this specification presents the prior art and the preferred embodiment in the context of a food cutter cutting potatoes. Cutting potatoes has been the most common application of the present machine. However, it should be distinctly understood that these hydraulic food cutters are capable of cutting and are used to cut a wide variety of food products.

In a typical prior art hydraulic cutting apparatus where potatoes are to be cut, the potatoes are dropped into a tank filled with water and then pumped through conduit into an alignment chute or tube wherein the potatoes are aligned and accelerated to high speed before impinging upon a fixed array of cutter blades where the potato is cut into a plurality of smaller pieces.

The basic configuration of a prior art system, with the present invention added in, is shown in schematic format in FIG. 1. One of the main components of a prior art hydraulic cutting apparatus for use in cutting potatoes is a receiving tank into which peeled or unpeeled potatoes are dropped. A food pump, usually a single impeller centrifugal pump, is provided. It draws its suction from the receiving tank and pumps water and the suspended potatoes from the tank into an accelerating tube which functions as the converging portion of a venturi. The accelerator tube is used to accelerate and align the potatoes immediately prior to impinging upon the stationary knife blades of the cutter blade assembly.

Each whole potato impinging upon the knife blade assembly passes through the cutting blade array and is thereby cut into a plurality of food pieces, for example french fry pieces, which pass with the water into the second half of the venturi which is a diverging tube in which the water and the cut food pieces are decelerated back to a slower velocity. The water and cut food pieces are then deposited onto a dewatering conveyer chain. The water passes through the dewatering conveyor chain and is collected and recycled back to the receiving tank. The cut food pieces remain on the conveyor chain and are carried off for further processing.

In the past, significant effort has been directed toward the development of good alignment or acceleration tubes which can properly align and accelerate the whole food product so that each whole food product is properly centered relative to the cutter blade array prior to impinging upon it. Additional efforts have been made to develop cutter blade arrays or head assemblies that can be used to cut whole food product without plugging. Examples of these efforts can be seen in my patents, U.S. Pat. Nos. 5,095,794, and 5,125,308, which disclose designs for cutter blade arrays. U.S. Pat. No. 4,614,141 teaches an alignment tube assembly which is used to accelerate and align whole potatoes immediately prior to impinging upon a cutter head array. The teachings of U.S. Pat. Nos. 5,095,794, 5,125,308 and 4,614,141 are hereby incorporated by reference.

The problem is that, despite efforts to develop good alignment or acceleration tubes and cutter blade assemblies, virtually all hydraulic cutters will still occasionally plug. The exact mechanism by which a potato plugs or fails to pass cleanly through a cutter blade assembly involves the study of hydrodynamics, and statistics and dynamics as they relate to the cellular structure of food products. As a result, the exact mechanism by which the cutter head plugs is not known. All that is known is that, despite all recent efforts, occasionally a food product, such as a potato, will not pass completely through the cutter head assembly, either leaving behind portions of cut food product and/or portions of uncut food product.

What happens when a food product does not pass completely through the cutter blade assembly is that the machine rapidly plugs up. For potatoes, at a 20,000 pound per hour cutting rate, given an average 10-ounce potato, the number of potatoes passing through the cutter blade assembly is approximately 32,000 potatoes per hour, or approximately 8.8 potatoes per second. If one potato plugs the cutter blade assembly, in 10 seconds there will be 88 potatoes backed up behind the cutter blade assembly; in 20 seconds, 176 potatoes. At 35,000 pounds per hour the problem is further aggravated. In practice, if a prior art hydraulic cutting apparatus plugs while unattended, it is not uncommon for the plug to include backed up, smashed potatoes all the way back and into the food pump. A plug such as this can take hours to clean out since it requires substantial disassembly of the machine and its attendant piping. As a result, it is common practice in food processing plants to provide operating personnel to continuously monitor the operation of the hydro-cutting system.

The study of what actually happens on a microscopic or cellular level when a food product, such as a potato, impinges upon the cutting blades of a cutter blade assembly is actually the study of hydrodynamics interplaying with the physics of the tearing and breaking of organic cellular structure. As a result, the actual dynamics of the cutting cannot be accurately and completely mathematically modeled. Design of cutter blade assemblies and the establishment of cutter parameters, such as fluid flow, volumes and rates for food product feed, are generally empirically determined. One thing is known, however, and that is that the sharper the cutting edges of the cutting blades, the better the quality of the cut food pieces being produced by the hydraulic food cutter. For this reason it is common practice in the industry to replace the cutter blade assembly after every three to four hours of use with a new cutter blade assembly having resharpened or replaced cutter blades. In general, a three or four hour replacement schedule is commonly used in the potato processing industry and is a compromise between food product quality and production efficiency. Replacement of the blades more frequently would produce a higher quality product. However, in the prior art, replacement of the blade holder assembly required shutting down the system for a significant period of time, and as a result the three or four hour changeover rule has been generally followed. The present invention provides a means whereby cutter heads can be replaced on a much more frequent basis than that generally available to prior art systems.

Accordingly, it is an object of the present invention to provide an apparatus which quickly senses the presence of the failure of a food product to pass completely through the cutter blade array so that the machine can either shut down, or, alternatively, automatically replace the cutter blade array assembly which is plugging with an unplugged, or clean, cutter head assembly.

Another object of the present invention is to provide a hydro-cutter assembly which has a mechanism whereby the cutter head assembly can be quickly removed from the line of fluid flow so that a mass of plugging food product can be flushed through the system, thus eliminating the need to shut the entire system down for manual removal of a plugging mass of food product.

A third object of the present invention is to provide a hydro-cutting assembly which has the capability of either periodically or selectively changing cutter blade arrays so as to ensure that dull cutter blade knives are replaced prior to deterioration of the quality of the cut food product being processed.

SUMMARY OF THE INVENTION

These objects are achieved by use of a hydraulic line switcher which enables the selective switching of the discharge of a suspension of fluid and food product from a hydraulic food pump into one of a number of discharge lines which are directly coupled to associated cutter blade assemblies. Switching can be accomplished either automatically or in a manual mode. Automatic control is used in cases where the initiation of a partial system plug up is detected, or manually for purposes of routine maintenance and cleaning.

A flexible tube formed of vulcanized rubber, reinforced with polyester cord, connects between a fixed intake and a slidable slide valve assembly at the discharge end. The flexible tube is supported by a cradle which itself is supported by traveler car assemblies which allow the cradle to be displaced angularly and still remain in alignment with the flexible tube as it is shifted from one position to another.

The upstream end of the flexible tube is connected to the discharge line of a hydraulic food pump in a hydro-cutting assembly by means of an intake slide coupler which interfits a receiving flange at the pump discharge line. The flexible tube is mechanically connected to the intake slide coupler by means of a coupler ring. A water seal is maintained by means of an 0 ring interfitting within a cylindrical notch in the intake slide coupler. The use of the slide coupler provides an adjustment means for compensating for varying lengths of the flexible tube and also for the compression of the flexible tube which occurs during the angular movement of the tube from between its full extension at one side to full extension at a second position.

At the discharge end of the flexible tube there is a similar coupling arrangement which utilizes an output coupler which interfits within a discharge flange formed in the flexible tube. It, in turn, is connected to a slide valve coupling by use of a quick-release coupler ring.

A slide valve assembly is provided which has a slide plate interfitting between an upstream cam plate and a downstream discharge plate. This slide plate is provided with a fluid orifice and can be positioned to direct fluid flow through the flexible tube and slide valve coupling into one of a plurality of discharge ports formed in the downstream discharge plate.

Means for moving the slide plate from alignment with one discharge orifice to another is provided by means of a dual action air cylinder mechanically connected to the slide plate by means of a lever which is itself pivoted to provide a mechanical advantage to increase the speed at which the slide plate can be moved from one position to another. The dual action air cylinder is sized and powered to generate between 550 to 1100 pounds of shear force when moving the slide plate and also to provide a shifting of the slide plate from one discharge port to another within approximately 250 milliseconds, so as to shear any food product caught between the slide plate and either the cam plate or the discharge plate during movement, and also to preclude the initiation of a system blockage caused by a blockage of fluid flow and the queuing of food products against it in sufficient numbers to cause a system blockage.

A pressure sensing transducer is provided, to sense system over pressures in the hydraulic portion of the hydraulic cutting system. In the case of the preferred embodiment, it is located in the discharge line downstream from the hydraulic food pump. A normal band of system over pressures induced by food products impinging upon a fixed array of cutter blades within a cutter blade assembly, is determined, and a system over pressure set point, which is indicative of the initiation of a system plug up, is established, to actuate an automatic switching from one discharge line to another.

BEST MODE FOR CARRYING OUT INVENTION

For purposes of clarity, the preferred embodiment of the present invention described in this specification is presented in the context of use with a hydraulic cutting system for cutting potatoes. Cutting potatoes is one of the more common applications for hydraulic cutting assemblies, however it should be distinctly understood that the hydraulic line switcher of the present invention is capable of being incorporated into virtually any hydraulic system wherein there is a need to selectively direct a flow of fluid into various conduits. Also, it should be pointed out that the preferred embodiment of the hydraulic line switcher described in this specification has the capability of switching between two discharge lines. It should be apparent to those skilled in the art that a hydraulic line switcher incorporating the features of the present invention could be easily designed and built to switch between any number of discharge lines. For example, between three lines wherein the initial start position is with the center line, it could switch to either the left or the right, the top or the bottom. As an additional example, the discharge lines could be in a circular array and the hydraulic line switcher could incorporate a slide plate capable of chordal movement from one position to the other around the circular array of discharge ports.

Figure 1:
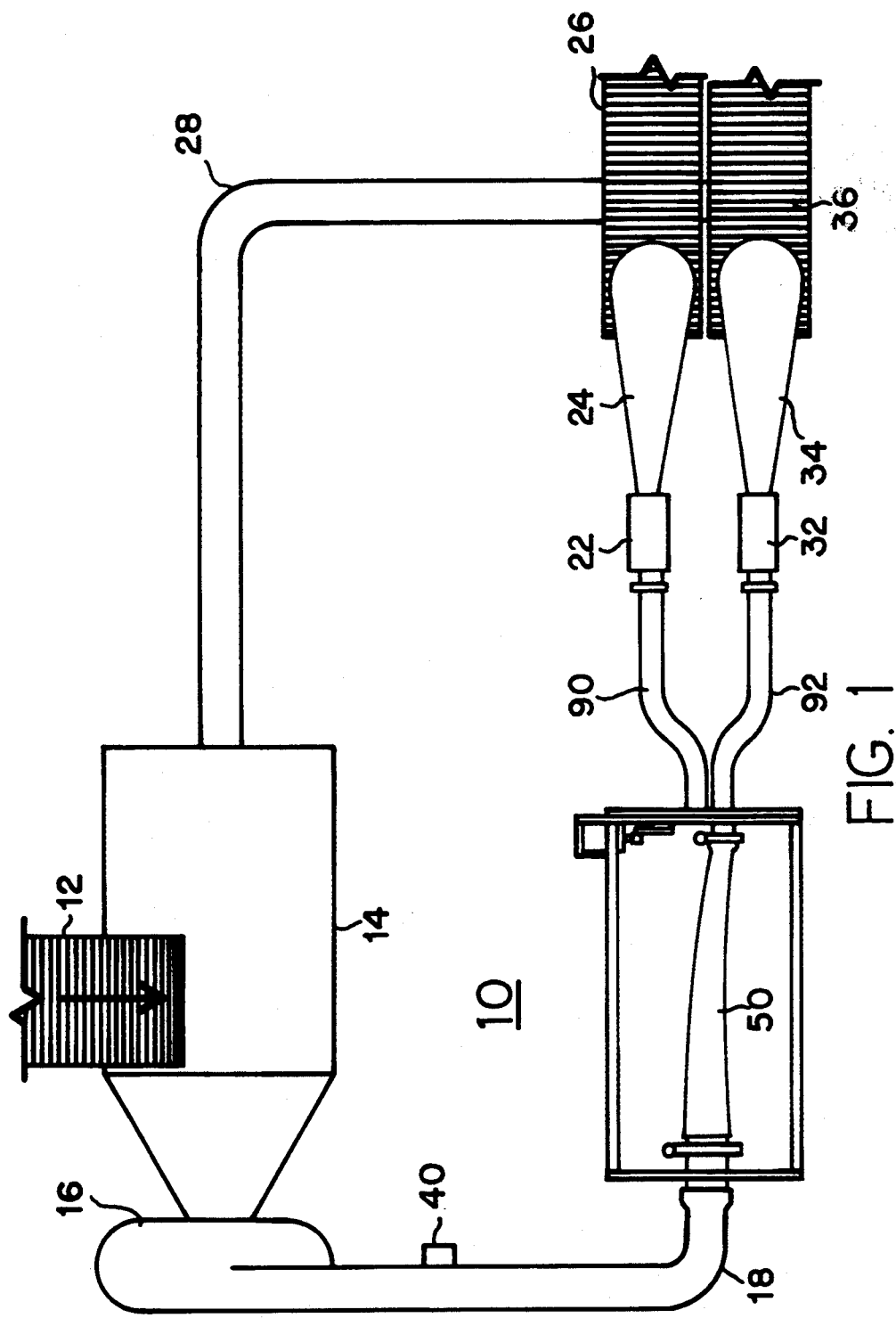
FIG. 1 is a schematic representational top plan view of a hydro-cutting system utilizing a hydraulic line switcher.

Referring to FIG. 1, there is shown in schematic representational format, a preferred embodiment of the hydraulic line switcher used in the context of selectively directing a discharge of water and potatoes into one of a pair of hydraulic cutter blade assemblies 22 or 32. In this embodiment, as shown in FIG. 1, infeed conveyor 12 is used to drop a supply of whole potatoes into vortex feed tank 14. Centrifugal food pump 16 draws a suction of whole potatoes, suspended in water, from vortex feed tank 14 and pumps them through discharge line 18 into the intake of hydraulic line switcher 10. Hydraulic line switcher 10 is then used to selectively direct the flow of whole potatoes suspended in water into either first discharge line 90 or into second discharge line 92. As shown in FIG. 1, the discharge is directed into second discharge line 92 which is direct-coupled to cutter blade assembly 32, and, because of its conical converging shape, is used to align and accelerate the whole potatoes prior to impacting a fixed array of blades contained within blade assembly 32. The cut food product and water then flow into decelerator loop 34 which is the diverging portion of a venturi established by the three components, flexible tube 50, cutter blade assembly 32, and decelerator loop 34. In the typical application, decelerator loop 34 bends up and around and is designed to drop onto dewatering conveyor 36 the suspension of cut food products, usually french fries, and water. The water flows through dewatering conveyor 36 into a collection tray, not shown, and ultimately back into water return line 28 which transports the water back to vortex feed tank 14. The cut food product does not pass through dewatering conveyor 36, but instead is carried off for further processing.

If hydraulic line switcher 10 is actuated to direct the flow of whole food product and water into first discharge tube 90, the whole food product will be processed in a similar fashion through cutter blade assembly 22 and decelerator loop 24 with the water passing through dewatering conveyor 26 and ultimately into return line 28, and the cut food product being carried off by dewatering conveyor 26.

As stated in the prior art section of this specification, efforts have been made to develop cutter blade assemblies and accelerator tubes which minimize the occurrence of plugging. The teachings of U.S. Pat. Nos. 4,614,141, 5,095,794 and 5,125,308 are examples of these efforts, and the teachings of said patents are hereby incorporated by reference. Also, as previously stated, potatoes are being pumped into the system at the rate of approximately 8.8 potatoes per second. If a plug-up occurs in either cutter blade assembly 22 or 32, and it goes undetected and unattended for even just several seconds, it will result in a system blockage caused by a mass of partially mashed whole potatoes. To clean out these system blockages, it is usually necessary to disassemble the hydraulic cutter system into component parts to clear the lines and the cutter head assembly.

In addition, the cutter blades used in the fixed array within cutter blade assemblies 22 and 32 are subject to rather rapid wear and are, in current industry practices, replaced with resharpened or new blades after every three to four hours of use.

The hydraulic line switcher of the present invention is, in the preferred embodiment, intended for use in conjunction with both the control system as shown and described in my co-pending patent application Ser. No. 08/019,581, as a means of diverting the flow of whole food product and water from one discharge line to another upon the detection of the initiation of a system blockage, and also as a means of manually switching a discharge, without system shut-down, for purposes of routine maintenance including the periodic replacement of cutter blades within cutter blade assemblies 22 and 32.

In order to accomplish these purposes in the preferred embodiment, both manual and automatic control systems are provided, as later described.

At the heart of hydraulic line switcher 10, as shown in FIGS. 2 through 9, lies flexible tube 50 which is formed of vulcanized rubber, reinforced with polyester cord. Virtually any material from which a flexible pipe can be formed is capable of being used, however the preferred embodiment utilizes the vulcanized rubber reinforced with polyester chord since it is generally regarded as an acceptable food grade material. The movement of flexible tube 50 from one position to the other is generally arcuate, and as a result, there is a small length change from the fully extended position when connected to one discharge tube, through a slight compression in the intermediate position, and back to the full extended position when aligned with the second discharge tube. In addition, there are some problems in the manufacturing processes for fabrication of polyester reinforced food grade rubber tubes which results in variations in overall length of flexible tube 50 from one tube to another. As a result, the intake coupling and connection assembly is designed to provide for a telescoping effect to compensate for both the arcuate movement and the variations in tube length. Intake coupling flange 48 is formed integral with flexible tube 50 to receive metal intake coupler 60. Metal intake coupler 60 is, in turn, mechanically coupled by means of coupler ring 68 to intake slide coupler 64. Intake slide coupler 64 is configured in size to slidably interfit within an expanded flange formed integral with pump discharge line 18. A water seal is provided by means of intake slide coupler 0 ring 66, which interfits within a notch ring formed integral with intake slide coupler 64. In this manner, the variations in the length of flexible tube 50 are compensated for, as well as the changes in length caused by the generally arcuate movement of flexible tube 50.

It should be noted that flexible tube 50, in the preferred embodiment, is designed as a converging tube to assist in the acceleration process which is required to align and accelerate food product prior to its entry into cutter blade assemblies 22 or 32. Thus, in its preferred embodiment hydraulic line switcher 10 replaces, both in retrofit applications and in new installations replaces the prior art accelerator tube, thus minimizing the amount of floor space used in the hydraulic cutting system production line. However, while this design feature has its advantages in the preferred embodiment, it is not necessary for effective operation of hydraulic line switcher 10.

At the other end, the discharge end of flexible tube 50, there is formed integral with flexible tube 50 discharge flange 72 which is sized to receive, in sealed fashion, output coupler 74. In turn, output coupler 74 is connected to slide valve coupling 76, which is formed integral with slide plate 78. Discharge flange 74 and slide valve coupling 76 are mechanically sealed together by means of coupler ring 46.

Figure 10:
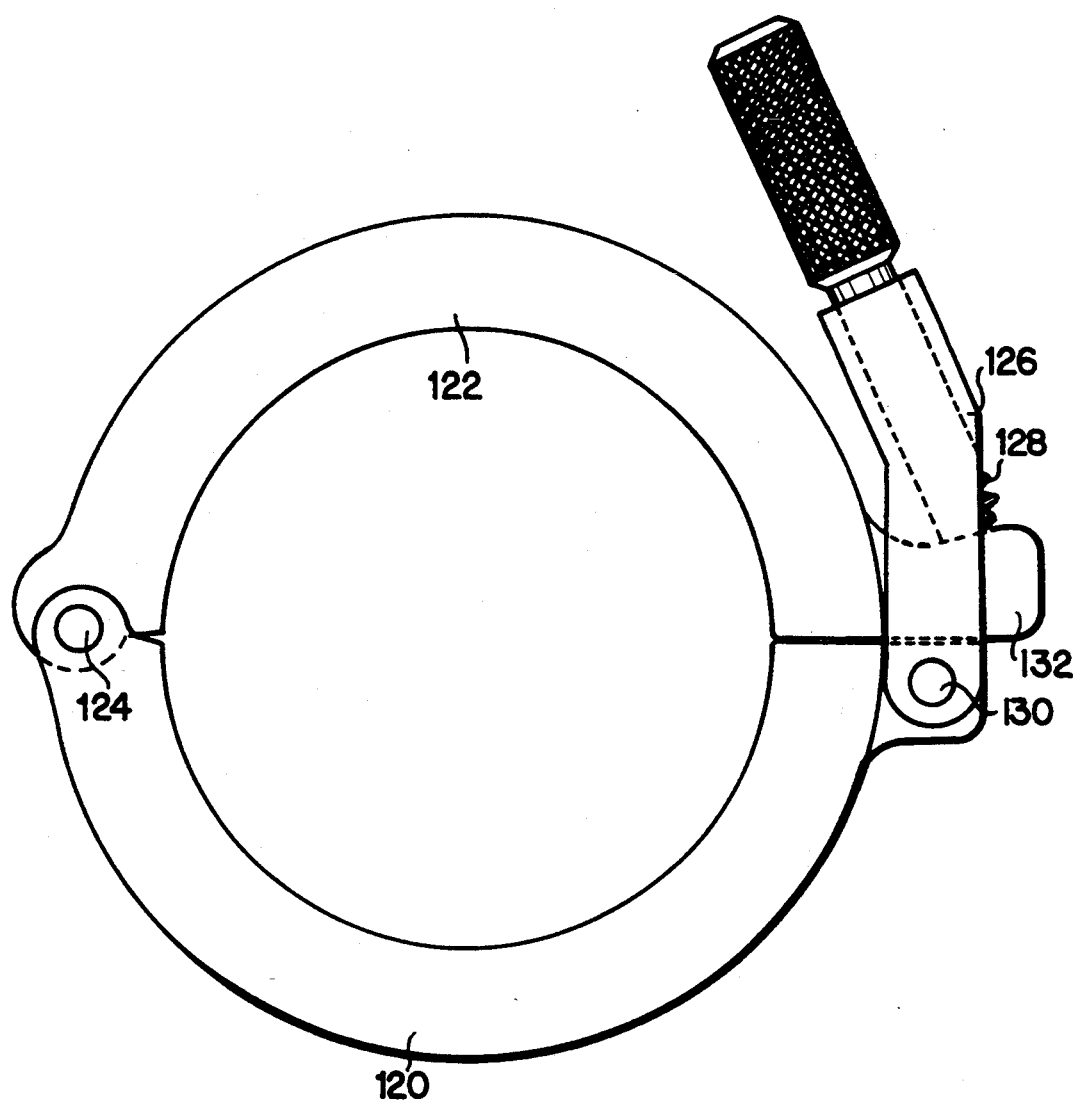
FIG. 10 is a side view of a quick release ring coupler in the closed position.
Figure 11:
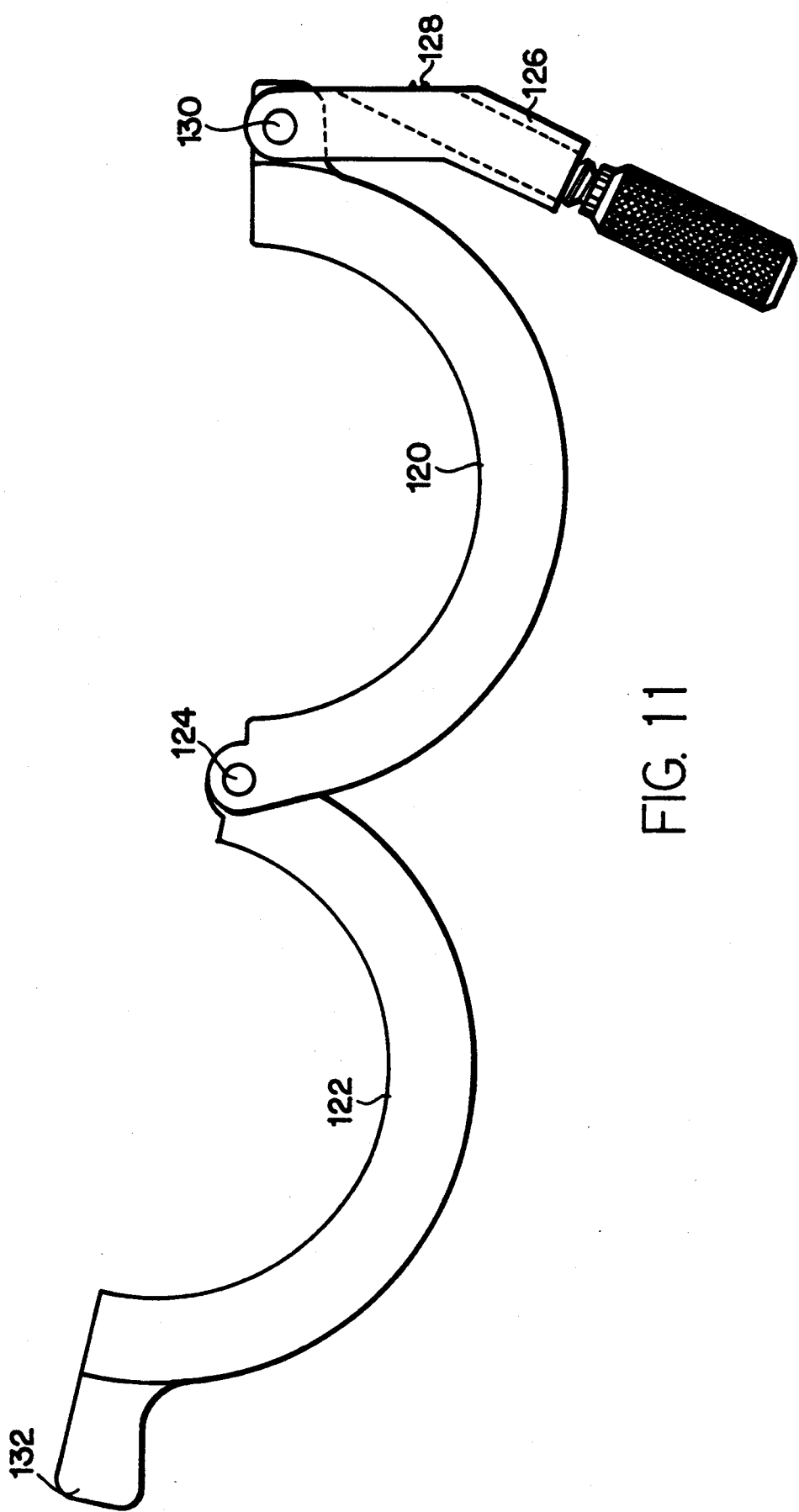
FIG. 11 is a side view of a quick release ring coupler in an open position.

Coupler ring 46 and coupler ring 68 are both of similar design and are shown in FIGS. 10 and 11. As can be seen in FIGS. 3, 4, 10 and 11, the couplers 46 and 68 are formed of three basic parts, lower ring 120, upper ring 122, and lock arm 126. Lower ring 120 and upper ring 122 are generally V-shaped and configured to clamp down around the flanged ends of the coupler flanges to hold them tightly sealed together. Lower ring 120 and upper ring 122 are both hinged together by means of hinge pin 124. Also hinged to lower ring 120 is lock arm 126 by means of hinge pin 130. Lock arm 126 is provided with lock arm screw 128, which tightens down upon upper ring cam stop 132 to form a compressive seal of lower ring 120 and upper ring 122 around the flanged ends of the pins.

Depending upon the length of flexible tube 50, a variety of other types of tubes could be adequately substituted. The length of flexible tube 50 determines the angle of deflection from one position to the another. Adequate substitutes could be fabricated of metal using flexible couplings at the inlet and discharge ends. Metal piping could be telescoping, or rigid. Fiberglass and food grade plastics could be substituted for rubber.

Flexible tube 50, when full of water and food product, can easily weigh sixty to seventy pounds. While it would be possible to construct flexible tube 50 of a material sufficiently strong enough to carry this weight without further support, in practice and in the preferred embodiment it has been found that lighter weight, more flexible materials can be used if flexible tube 50 is supported by means of cradle 52. Cradle 52 is formed of metal and is fabricated to conform to the shape of flexible tube 50 and supports the lower half of flexible tube 50.

Figure 2:
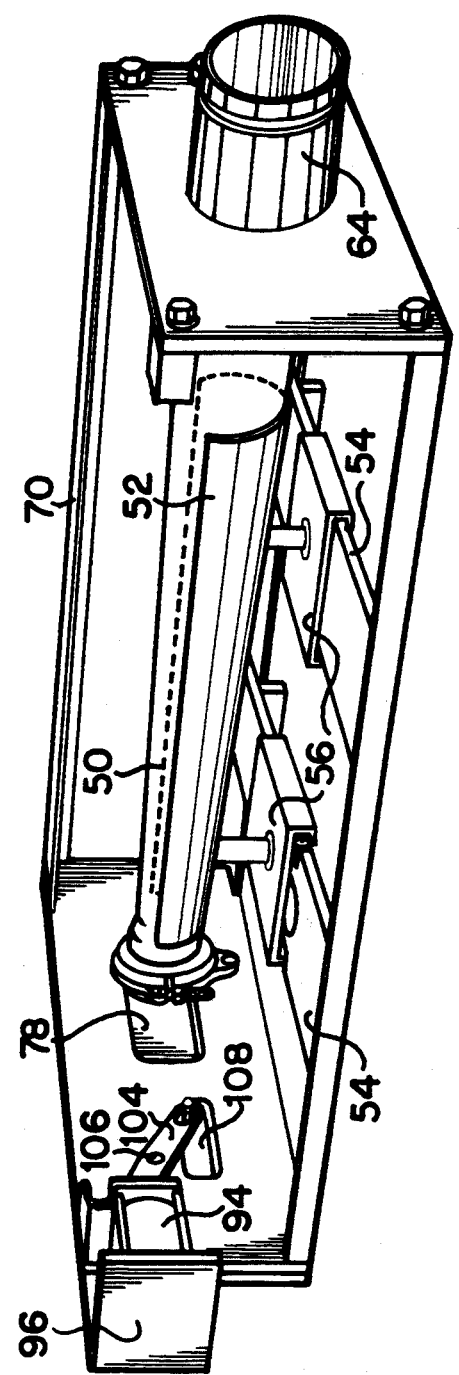
FIG. 2 is a perspective representational view of the hydraulic line switcher.
Figure 3:
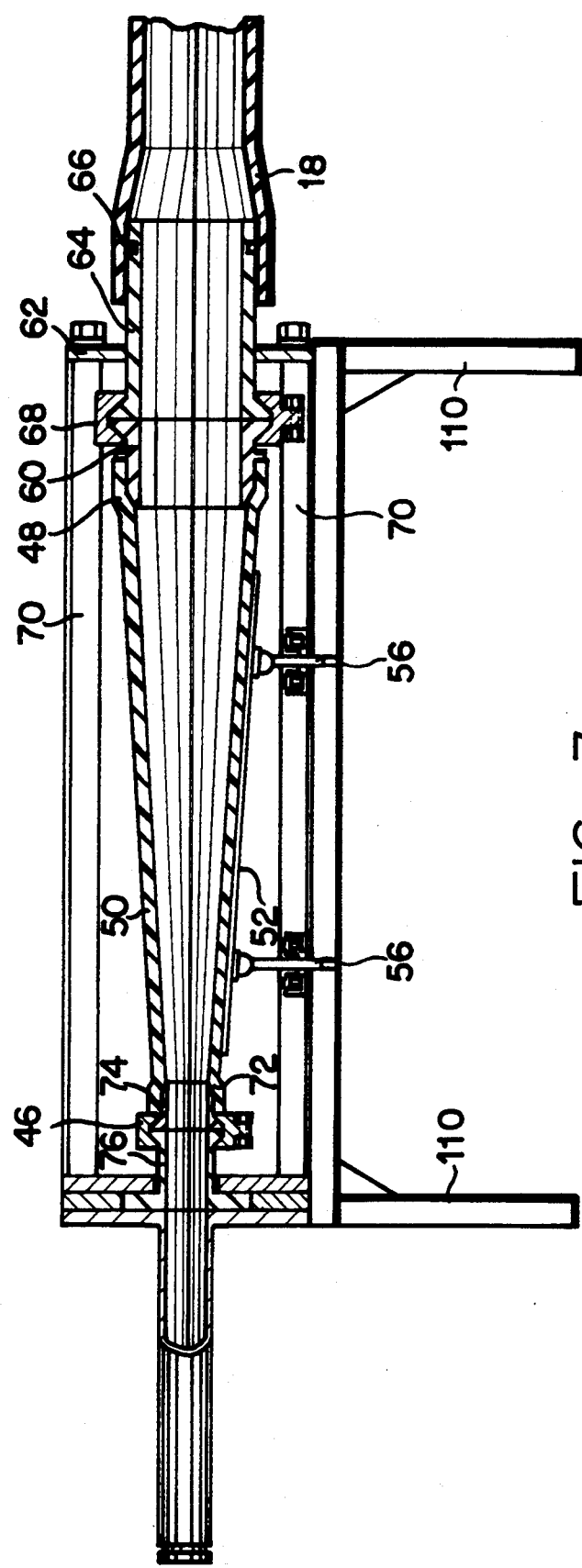
FIG. 3 is a sectional side view of the hydraulic line switcher.
Figure 4:
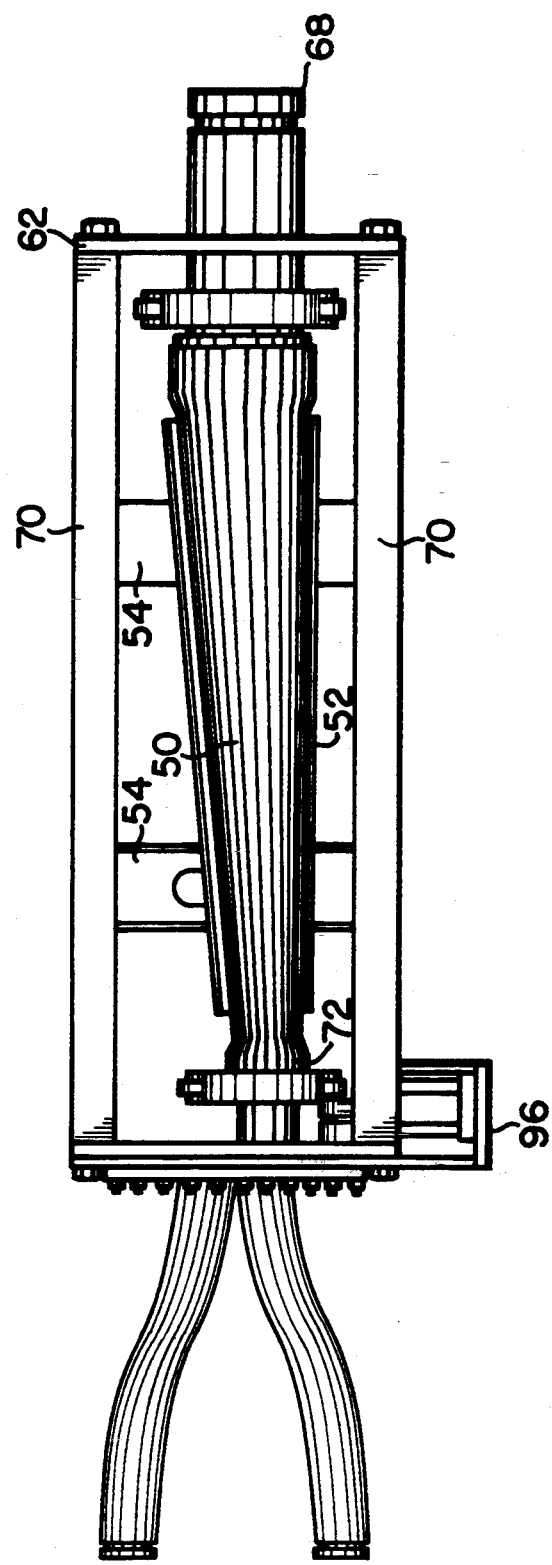
FIG. 4 is a top plan view of the hydraulic line switcher in a first position.
Figure 5:
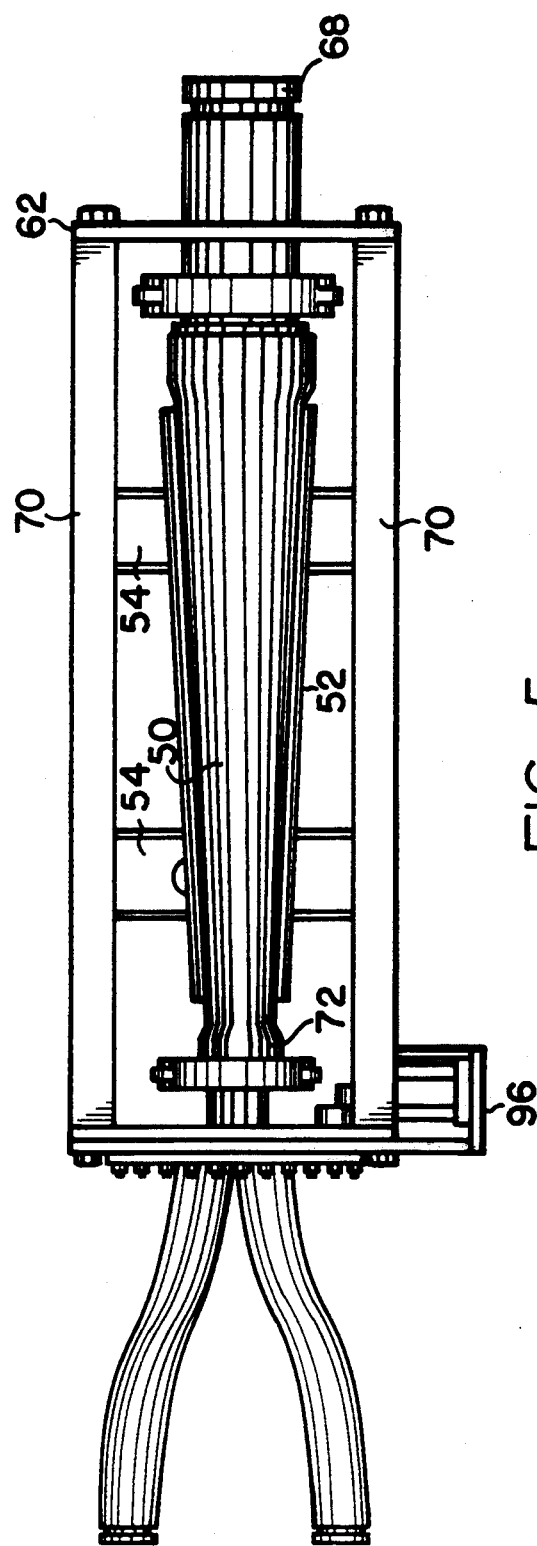
FIG. 5 is a top plan view of the hydraulic line switcher in an intermediate position.
Figure 6:
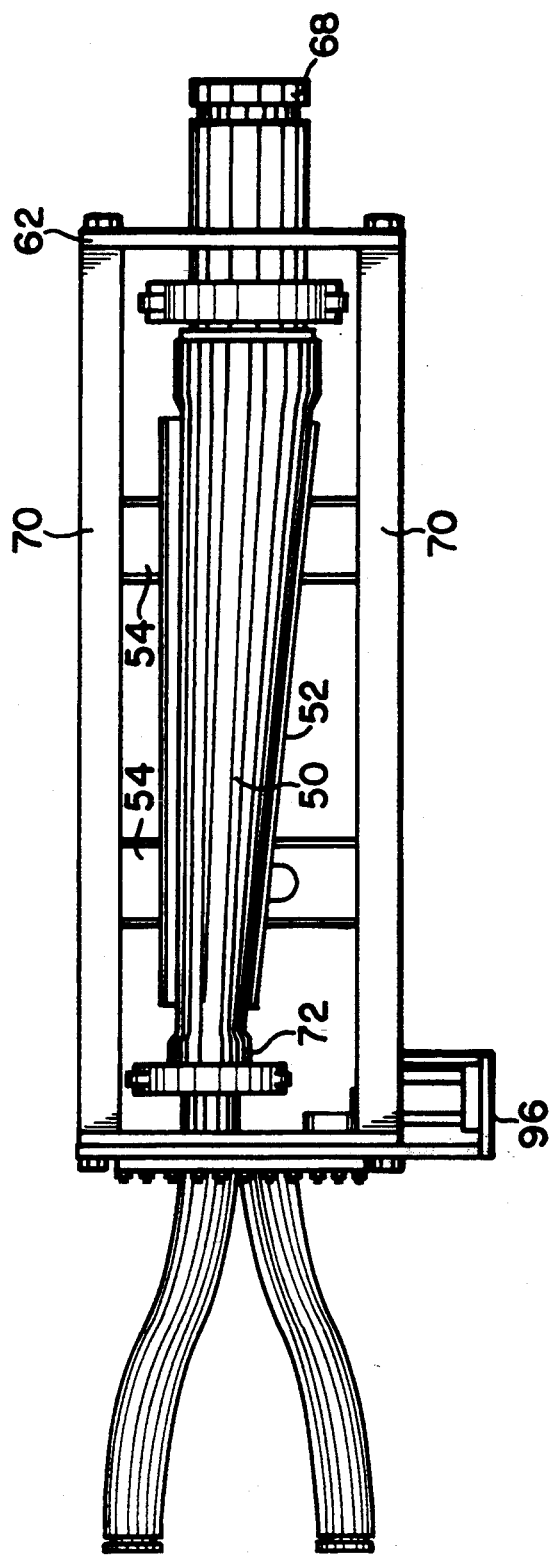
FIG. 6 is a top plan view of the hydraulic line switcher in a second position.
Figure 7:
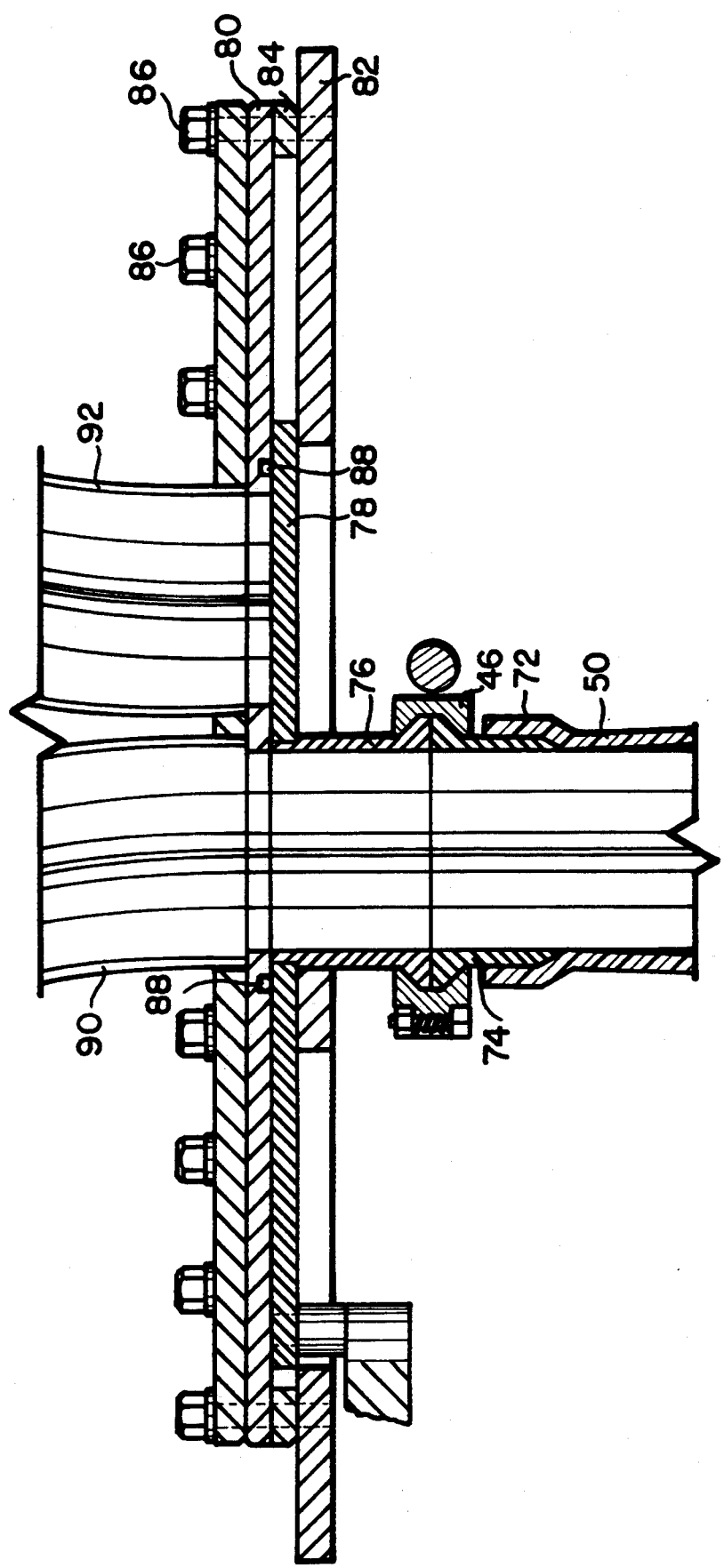
FIG. 7 is a sectional top view of the slide valve 10 subassembly of the hydraulic line switcher.
Figure 12:
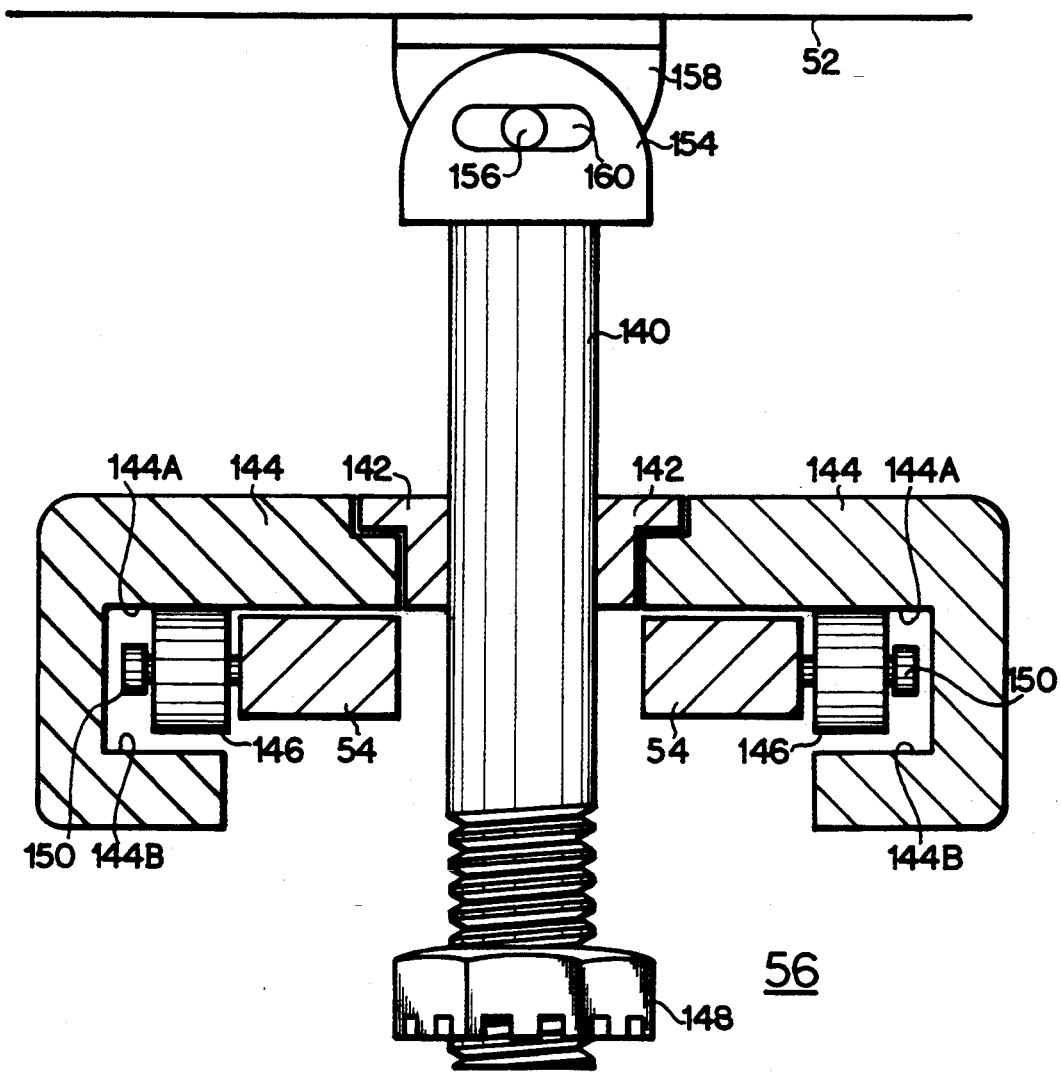
FIG. 12 is a sectional side view of a traveler car assembly.
Figure 13:
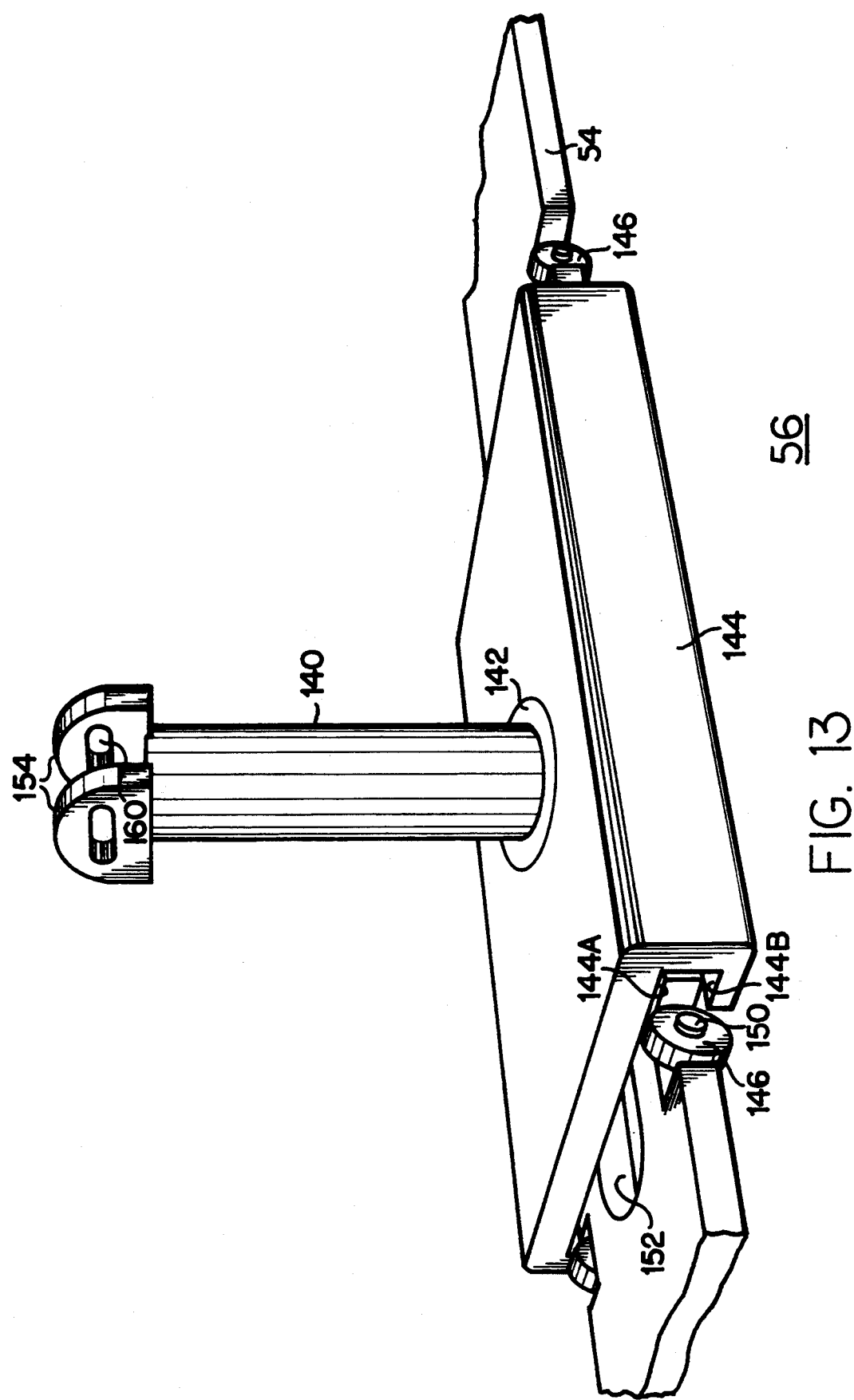
FIG. 13 is a perspective representational view of a traveler car assembly.

In the preferred embodiment, cradle 52 is itself supported by a pair of traveler car assemblies 56 which, as slide plate 78 is laterally displaced to direct the discharge of flexible tube 50 from one discharge port to another, slide along with flexible tube 52, thus eliminating alignment problems between cradle 52 and flexible tube 50. As shown in FIGS. 2, 12 and 13, cradle support traveler car assemblies 56 are themselves supported atop cradle support cross braces 54. Each assembly is of similar construction and provides, as a main structural component, cradle post 140 and attached cradle post collars 142. Each cradle post 140 has attached atop of it a pair of yoke arms 154 which have formed integral therewith elongated slots 160. Extending downwardly from cradle support 52 is cradle support bracket 158, which interfits between the pair of cradle yoke arms 154. Cradle pin 156 extends through cradle support bracket 158 and elongated holes 160 in cradle yoke arms 154 to provide a slidable mechanical connection which permits some fore and aft travel in cradle 52.

Cradle post collar 142 is frictionally and tightly engaged to cradle post 140, and extends through and is supported by traveler car plate 144. Cradle post collar 142 is not attached to traveler car plate 144 and is thus able to rotate to compensate for the angular displacement of cradle 52 during the shifting from one position to another. As shown in FIG. 13, a plurality of notches are formed integral with cradle support cross brace 54. These notches provide a holding space into which roller bearings 146 are held by means of roller bearing bolts 150. Formed integral with traveler car plate 144 are upper and lower roller bearing races 144A and 144B. Under normal loads, roller bearings 146 ride against upper race 144A of traveler car plate 144. During slide plate switching, it has been found that occasionally the switching action is violent enough that traveler car plates 144 will rock to the extent that roller bearings 146 ride upon lower race 144B.

As a further safety precaution to insure that cradle 52 does not become displaced during rapid movement, cradle post 140 also extends through cross brace slot 152 formed in cradle support cross brace 54. Cradle post nut 148 is threaded on to the downwardly extending portion of cradle post 140 to preclude cradle post 140 from popping out when line switcher 10 encounters particularly violent hydraulic shocks during the course of switching from one position to another.

At the discharge end of flexible tube 50, a slide valve assembly is formed of slide plate 78 interfitted between cam plate 82 and discharge plate 80. Cam plate 82 and discharge plate 80 are held in parallel spaced relationship by means of spacer plate 84 and bolts 86. As previously stated, slide valve coupling 76 is formed integral with slide plate 78 and thus forms a leak proof barrier between slide plate 78 and cam plate 82. However, on the other surface of slide plate 78, between it and discharge plate 80, pressurized fluid is present and, as a result, a waterproof seal is provided by means of slide plate seal ring 88.

First discharge tube 90 and second discharge tube 92 are provided and formed integral with discharge plate 80 and serve as the means of hydraulically connecting hydraulic line switcher 10 to the rest of the hydraulic cutting system.

As previously stated in the prior art section, at least as in use with a hydraulic cutting system for potatoes, on average, potatoes are flowing in the water and impacting upon the blades at the rate of 8.8 potatoes per second at a 20,000 pound per hour cutting rate, and at an average of 15.4 potatoes per second for a cutting rate of 35,000 pounds per hour. Also, it has been empirically determined that it only takes between three to five potatoes impacted against each other to form a blockage sufficient to plug the line.

8.8 potatoes per second translates to one potato passing through hole 94 slide plate 78 every 110 milliseconds. At 15.4 potatoes per second, the frequency is reduced to one potato every sixty milliseconds. Given the fact that three or four potatoes impacted together will block the line, this means that slide plate 78 must not present a sufficient blockage to hold potatoes in place for longer than 200 to 300 milliseconds.

Additionally, at the rate of 8.8 potatoes per second, assuming the potatoes are six inches long and the velocity is forty feet per second, there is at least a 10% chance that slide plate 78 will encounter or impact laterally against a potato as the slide plate is slid from one position to the other. For that reason, slide plates 78 must be capable of shearing a food product as it is repositioned. In practice it has been found that (at least in the case of potatoes) the ram must be capable of generating at least 200 pounds of force in order to move slide plate 78 quickly enough and with sufficient force to shear a food product caught between it and either front plate 80 or cam plate 82. In practice it has been found that if slide plate 78 can be repositioned in less than 250 milliseconds, plugging, while still possible, becomes more unlikely.

Figure 8:
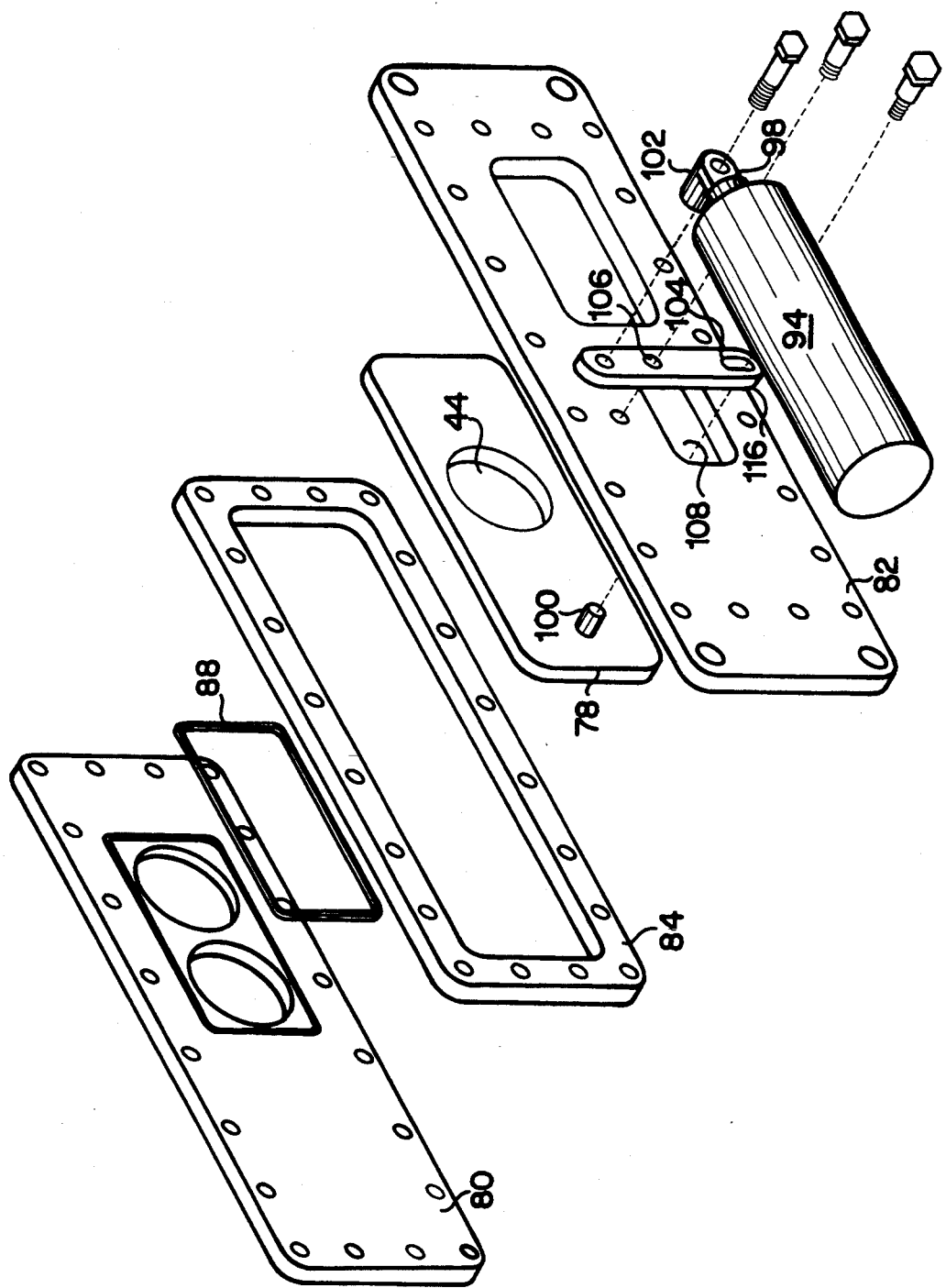
FIG. 8 is an exploded perspective representational view of the slide valve subassembly of the hydraulic line switcher.

As shown in FIGS. 2, 4 through 6 and 8, double action air cylinder 94 is provided and is operated in the range of 100-200 pounds per square inch and is capable of generating 550-1,100 pounds of shear force when activated for movement of slide plate 78. In the preferred embodiment double action air cylinder 94 is attached at one end to cam plate 82 by means of air cylinder attachment bracket 96. As shown in FIGS. 2, and 8, air cylinder piston shaft 98 is in turn attached to slide plate 78 by means of slide plate lever 104. Slide plate lever 104 provides a mechanical advantage, in that its pivot point 106 is displaced up toward the pivotal connection between slide plate lever 104 and piston shaft attachment bracket 102, thus shortening the throw of piston shaft 98 to effect the desired lateral shift in slide plate 78. Slide plate lever 104 is attached to slide plate 78 by means of extension post 100, which interfits within elongated lever slot 116 to provide a slidable linkage which compensates for the angular displacement of slide plate lever 104 about pivot point 106 relative to the lateral displacement of piston attachment bracket 102 during operation.

The mechanical advantage gained from slide plate lever 104 is used to enhance the speed that which slide plate 78 is shifted from one position to another.

However, it should be apparent to those skilled in the art that there are a variety of different means of attaching piston of air cylinder 94 to slide plate 78.

Figure 9:
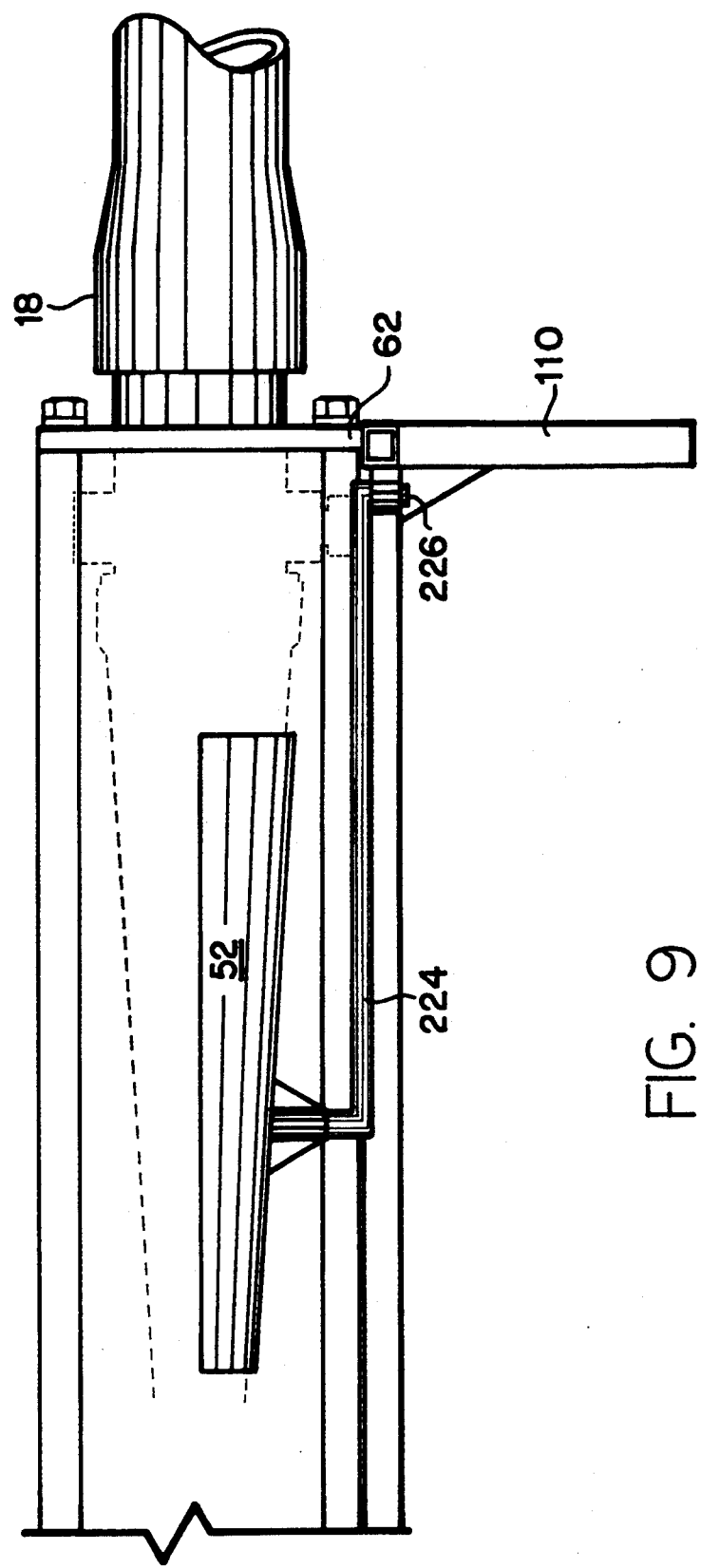
FIG. 9 is a side view of the hydraulic line switcher having a second embodiment of the tube support subassembly.

A second embodiment of the present invention, as shown in FIG. 9, incorporates the same slide valve assembly and actuation mechanisms, but it differs in how cradle 52 is supported. Instead of a cradle cam being slidably supported by traveler car assemblies 56, swing arm 224 attached to swing arm hinge pin 226 is provided. In this embodiment, the angular displacement of cradle 52 also closely matches the actual angular displacement of flexible tube 50 in operation. Also, this arrangement, with the addition of a hinge, not shown, between swing arm 224 and swing arm hinge pin 226 allowing for vertical motion, and the addition of a second cylinder attached in some fashion to either swing arm 226 or cradle 52, would easily provide vertical adjustment capabilities which would enable the use of different arrays of discharge ports either radial, or vertically, thus allowing for movement of slide plate 78 in both vertical and transverse orientations so that different arrays and discharge ports could be used.

Cross bases 70 and frame legs 110 complete the structural frame assembly and are sized to allow easy incorporation of hydraulic line switcher 10 into a hydraulic cutting system.

Hydraulic line switcher 10 can be incorporated into or retrofitted into existing hydraulic cutting systems. And used in conjunction with the sensors of my prior patent application Ser. No. 08/019,581 filed Feb. 18, 1993, to automatically switch the supply of whole food product and fluid from one cutting blade assembly to another upon the detection of the initiation of a system blockage.

At production rates between 20,000 to 35,000 pounds of potatoes per hour, given an average potato weight of 10 ounces, an average of between 8.8-15.4 potatoes will impinge upon and be cut and pass through a cutter blade assembly during each second of operation. As each potato impinges on the cutter blade assembly, for particle purposes it is instantaneously slowed down and thus presents a very quick transient blockage to fluid flow in the cutter blade assembly. This in turn produces a transient pressure spike in that portion of the system that is operating under hydraulic conditions, namely from the discharge of the feed pump 16 through the hydraulic line switcher 10, and either cutter blade assemblies 22 or 32 and into a portion of decelerator loops 24 or 34. These pressure transients travel through the hydraulic portion of the system at the speed of sound for the given fluid pressure in that particular part of the system.

A pressure sensing transducer 40, as shown in FIG. 1, can be used anywhere within the hydraulic portion of the hydraulic cutting assembly to sense these pressure transients. Under normal operating conditions, as each potato impinges upon, is cut into pieces, and passes through the cutter blade assembly, it will generate a pressure transient. These pressure transients can be empirically measured, and a range of normal pressure transients can be established.

When a potato or other food product impinges upon the cutter blade assembly and does not pass through, it presents a physical blockage to the continued fluid flow through the pressurized portion of the hydraulic system. This results in a more extreme, or larger pressure transient which will be of greater magnitude than the normal pressure transients, indicating the clean passage of potatoes through the cutter blade assembly. This signal can, in turn, be used as a control signal to activate air cylinder 94 of hydraulic line switcher 10 to switch from one discharge port to the other.

As shown in FIG. 1, pressure sensing transducer 40 is installed in the hydraulic portion of the hydraulic cutting system. In this case, in the discharge line 18 from pump 16. By empirical testing, the appropriate band width within which normal pressure transients will occur as food products impinge upon and are cut by either cutter blade array 22 or 32 can be determined. The actual setting must be empirically determined, since most hydraulic cutting systems are different. The reason for this is that there are a number of variables which make the precalculation of pressure transients difficult, if not impossible. For example, when testing and measuring pressure transients in a hydraulic food cutter with automatic blade changers as described in my patent application Ser. No. 08/019,581 filed Feb. 18, 1993, using a cutter head assembly configured to cut french fried pieces of 9/32 square inches from an average of 10 ounce potatoes, it was determined that the majority of the potatoes passing through the cutter blade assembly generated a pressure transient of approximately one pound over system pressure. On occasion, with larger than normal potatoes, or if two potatoes were closely spaced together, pressure transients of up to two pounds were generated. It was found that two and one half pounds or more of over pressure was indicative of a potato not passing completely through the cutter blade assembly, and thereby potentially generating a partial plug. A complete plug or flow stoppage in the liquid flow pathway generated a six pound pressure transient. Once the normal band width pressure transients have been determined, an empirically determined set point can be selected for purposes of detecting a partial blockage of the system caused by a food product failing to pass cleanly through the cutter blade assembly. Once the pressure sensor 40 detects a pressure transient above this empirically determined set point, a control signal in the conventional manner, can be used to activate air cylinder 94 from alignment with one discharge tube to the other. In the preferred embodiment, conventional hydraulic or air control valves are used to detect the current position of slide plate 78 and to direct control air to double action air cylinder 94 in the appropriate direction for the next movement.

It should be pointed out that the preferred embodiment incorporates the use of a dual action air cylinder 94. However there are a number of other devices for activating slide plate 78 including, fluid hydraulics and electromechanical systems which can range from electrical stepping motors to rack and pinion gear assemblies. What is required to practice the present invention is that the actuating system must be capable of generating sufficient pounds of force to move slide plate 78 from the first position to the other while at the same time quickly shearing whole food product which may be caught in the pathway of the slide.

While there is shown and described the present preferred embodiment of the invention, it is to be distinctly understood that this invention is not limited thereto but may be variously embodied to practice within the scope of the following claims.

I claim:

1. A hydraulic line switcher for use with solids suspended in a flowing fluid which comprises:
   a slide plate having a first surface and a second surface and an aperture for the passage of solids suspended in fluid therethrough;
   a discharge plate having a first surface and a second surface and a plurality of apertures for the passage of solids suspended in fluid therethrough;
   means for holding the second surface of the slide plate in parallel, slidable relationship to the first surface of the discharge plate;
   a conically tapered tube having a larger inlet and a smaller outlet end and formed of resilient material for the passage of solids suspended in a fluid received from the inlet end at a fixed location, and therethrough to the outlet end connected to the first surface of the slide plate in operative alignment with the aperture within the slide plate; and
   means for selectively aligning the aperture of the slide plate with each of the apertures of the discharge plate.

2. The hydraulic line switcher of claim No. 1 wherein the means for selectively aligning the aperture of the slide plate with each of the apertures of the discharge plate further comprises motive power means having sufficient force to shear a solid suspended in the fluid into two or more pieces as the slide plate is slid from a position of alignment of its aperture with one aperture in the discharge plate into alignment with another aperture in the discharge plate.

3. The hydraulic line switcher of claim No. 2 wherein the means for selectively aligning the aperture of the slide plate with each of the apertures of the discharge plate further comprises motive power means having sufficient speed to move the slide plate from alignment with one aperture in the discharge plate into alignment with another discharge plate aperture in 300 milliseconds or less.

4. The hydraulic line switcher of claim No. 3 wherein the motive power means further comprises a dual action air cylinder generating at least 200 pounds of force operatively connected to the slide plate.

5. The hydraulic line switcher of claim No. 2 wherein the motive power means having sufficient force to shear a solid suspended in the fluid into two or more pieces as the slide plate is slid from a position of alignment of its aperture with one aperture in the discharge plate into alignment with another aperture in the discharge plate further comprises a dual action air cylinder generating at least 200 pounds of force.

6. The hydraulic line switcher of claim No. 1 wherein the means for selectively aligning the aperture of the slide plate with each of the apertures of the discharge plate further comprises motive power means having sufficient speed to move the slide plate from alignment with one aperture in the discharge plate into alignment with another discharge plate aperture in 300 milliseconds or less.

7. A hydraulic line switcher for use with food products suspended in a flowing fluid which comprises:
   a slide plate having a first surface and a second surface and an aperture for the passage of food products suspended in fluid therethrough;
   a discharge plate having a first surface and a second surface and a plurality of apertures for the passage of food products suspended in fluid therethrough;
   means for holding the second surface of the slide plate in parallel, slidable relationship to the first surface of the discharge plate;
   a conically tapered tube having a larger inlet and a smaller outlet end and formed of resilient material for the passage of food products suspended in a fluid received from the inlet end at a fixed location, and therethrough to the outlet end connected to the first surface of the slide plate in operative alignment with the aperture within the slide plate; and means for selectively aligning the aperture of the slide plate with each of apertures of the discharge plate.

8. The hydraulic line switcher of claim No. 7 wherein the means for selectively aligning the aperture of the slide plate with each of the apertures of the discharge plate further comprises motive power means having sufficient force to shear a food product suspended in the fluid into two or more pieces as the slide plate is slid from a position of alignment of its aperture with one aperture in the discharge plate into alignment with another aperture in the discharge plate.

9. The hydraulic line switcher of claim No. 8 wherein the means for selectively aligning the aperture of the slide plate with each of the apertures of the discharge plate further comprises motive power means having sufficient speed to move the slide plate from alignment with one aperture in the discharge plate into alignment with another discharge plate aperture in 300 milliseconds or less.

10. The hydraulic line switcher of claim No. 9 wherein the motive power means further comprises a dual action air cylinder generating at least 200 pounds of force operatively connected to the slide plate.

11. The hydraulic line switcher of claim No. 8 wherein the motive power means having sufficient force to shear a food product suspended in the fluid into two or more pieces as the slide plate is slid from a position of alignment of its aperture with one aperture in the discharge plate into alignment with another aperture in the discharge plate further comprises a dual action air cylinder generating at least 200 pounds of force.

12. The hydraulic line switcher of claim No. 7 wherein the means for selectively aligning the aperture of the slide plate with each of the apertures of the discharge plate further comprises motive power means having sufficient speed to move the slide plate from alignment with one aperture in the discharge plate into alignment with another discharge plate aperture in 300 milliseconds or less.

* * * * *